United States Patent [19]

Sumner et al.

[11] 3,969,539

[45] July 13, 1976

[54] PROCESS FOR PREPARING SYNTHETIC FOOD PRODUCTS

[75] Inventors: Arthur K. Sumner, Saskatoon; Linda M. Leinan, St. Jean; Clarence G. Youngs, Saskatoon, all of Canada

[73] Assignee: Canadian Patents and Development Limited, Ottawa, Canada

[22] Filed: May 31, 1973

[21] Appl. No.: 365,662

[30] Foreign Application Priority Data
June 2, 1972 Canada................................. 143692

[52] U.S. Cl.............................. 426/641; 426/652; 426/656; 426/471; 426/473; 426/506; 426/104
[51] Int. Cl.² ............................................. A23J 3/00
[58] Field of Search ............. 426/89, 104, 145, 146, 426/151, 199, 274, 212, 362, 364, 455, 467, 517, 297, 443, 502, 652, 601, 641, 656

[56] References Cited

UNITED STATES PATENTS

| | | | |
|---|---|---|---|
| 2,802,737 | 8/1957 | Anson et al..................... | 426/212 X |
| 3,537,859 | 11/1970 | Hamdy........................... | 426/364 X |
| 3,644,121 | 2/1972 | Boyer et al. .................... | 426/364 X |
| 3,736,148 | 5/1973 | Katz.................................. | 426/151 |
| 3,772,035 | 11/1973 | Carp et al. ....................... | 426/364 X |
| 3,840,679 | 10/1974 | Liepa et al........................ | 426/104 |

*Primary Examiner*—Raymond N. Jones
*Assistant Examiner*—R. A. Yoncoskie
*Attorney, Agent, or Firm*—Sughrue, Rothwell, Mion, Zinn & Macpeak

[57] ABSTRACT

Food products, such as meat, poultry and fish analogs, are prepared from plant protein concentrate by formulating an aqueous dispersion of the protein with or without the addition of an edible oil, converting the dispersion to a dry sheeted product, laminating the sheets and thereafter rehydrating the product.

17 Claims, No Drawings

PROCESS FOR PREPARING SYNTHETIC FOOD PRODUCTS

This invention relates to a process for preparing a food product, for example, a meat, poultry or fish analog.

The relatively high cost of high protein foods, such as meat and fish and their scarcity in major areas of the world have long constituted economic and nutritional problems. Protein malnutrition is prevalent in the underdeveloped and overpopulated areas of the world and the situation is forecast to become progressively worse.

A number of attempts have thus been made in the past to provide substitutes. Meat analogs have been manufactured by a spinning process, according to which highly purified soy protein solutions are converted into filaments which are then colored, flavoured and texturized into the desired meat analog. However, this spinning process is somewhat expensive because of the cost of obtaining the high purity protein required and the elaborate mechanical processing involved.

An extrusion process has also been used to make meat analogs, wherein soy flour containing about 50 percent protein is mixed with other ingredients to form a paste which is passed through a cooker extruder to produce a form of imitation meat. Generally speaking this extrusion process is suitable for producing ground and granular products which are most suitable as meat extenders.

Meat analogs have also been produced for many years by traditional methods in Asia by boiling soy milk in large vats to form a high protein skin which is removed with bamboo poles and dried to form soy pastry which can be flavoured and cooked. However, this manual process is inefficient and would be prohititively expensive in high labor cost areas. Moreover, the process cannot be readily mechanized.

Accordingly, a clear need exists for a simple and economic process of obtaining synthetic food products resembling meat and fish and exhibiting satisfactory flavor, appearance and texture characteristics. The appeal of imitation meat, poultry and fish analogs is partially due to their resemblance to the natural foods which are widely accepted as premium quality foods. Meat analogs have the additional advantage over the natural product that the amount and type of dietary fat can be controlled, and cholesterol can be excluded. Such products also have special appeal to consumers who do not eat natural meat or fish because of religious, health or philosophical reasons. Furthermore, meat and fish analogs can offer cost savings compared to the natural products, because plant protein can be produced much more efficiently than animal protein. For example, animal protein in North America is about ten times more expensive than soy protein in the unprocessed state.

According to one aspect of the present invention there is provided a process for preparing a food product, comprising forming an aqueous solution or dispersion containing plant protein concentrate with up to 40 percent edible oil by weight of the total solids plus oil, converting the solution or dispersion to a sheeted dry product, and thereafter rehydrating the sheeted product to a moisture content of at least about 50 percent. Preferably, the product is laminated.

According to another aspect of the invention, there is provided a texturized food product in sheet or laminate form comprising plant protein concentrate with up to 40 percent natural or added edible oil by weight of the solids and oil. The term "edible oil" as used herein is intended to include natural and synthetic oils and fats including partially hydrogenated natural oils and fats.

The rehydrated product is ready for cooking and can be packed and refrigerated in this condition. Alternatively, the product can be dried for storage, e.g. to a maximum moisture content of 5 percent to avoid deterioration by microbiological action, especially when stored at ambient temperatures, and would normally thereafter be moistened or rehydrated prior to use.

By the addition of appropriate synthetic or natural flavoring material, the synthetic food product of the invention can simulate for example, meat, poultry or fish. Flavoring can be added at any stage of the process, but is preferably added during the last rehydration step. When contemplated for use in stews, casseroles or soups, the product can be employed in unflavored form provided that adequate flavor is afforded either by natural meat present or by separate additives.

Conversion of the aqueous solution or dispersion to a dry product can conveniently be accomplished by sheeting the product, for example, on a drum dryer. If a flexible sheet is required for immediate folding or laminating, a moisture content of about 10 to about 25 percent is desirable. Preferably, the dry product has a moisture content of about 15 percent by weight. As indicated, the dried product is thereafter rehydrated which results in the provision of texture to the product. A sheeted product can conveniently be converted to a laminate of desired thickness by folding or stacking a suitable number of sheeted layers and if desired lightly compressing the laminated product to improve coherence. Lamination can be undertaken before or after the rehydrating step.

In a preferred embodiment of the invention the dehydration-rehydration operation is repeated at least once more and this can be carried out, for example, on a laminate. This results in an appreciable improvement in texture, which represents one of the main practical problems, in the production of meat and fish analogs, in that the resulting protein-containing material tends to be softer and less bite-resistant than natural cooked meat or fish. The repeated dehydration-rehydration surprisingly markedly improves the texture and bite-resistance of the product. The process of sheeting, drying and rehydrating can be operated in continuous or batch manner.

Depending on the intended use of the product, appropriate flavouring and colouring may be added at any stage. As indicated above, these operations are most effectively carried out during the final rehydration step. In general, a rehydrated product may be eaten as such or after cooking by normal methods which enhance any added flavour.

A number of different plant protein materials may be employed in the process of the invention, for example, pea, soybean, and rapeseed protein concentrates. However, the invention is particularly applicable to the use of pea protein concentrate which can be prepared from peas by separation and removal of the starch content. A convenient method involves grinding the peas, e.g. to about 100 mesh, to form a flour and converting the flour into an aqueous slurry to which a small amount of a base such as calcium oxide may optionally be added.

The slurry is preferably passed through a pulp refiner for further grinding and mixing and the starch content is then removed from the slurry, for example by centrifuging. The resulting concentrated pea protein remains as a solution or dispersion and is suitable for use in the process of the invention. Pea and other plant protein concentrates can also be obtained in other ways, such as fine grinding followed by air classification.

In carrying out the process of the invention, in order to facilitate lamination and to obtain products with satisfactory firmness and consistency, it is preferable that the total edible oil content be regulated within the range of about 10 to about 40 percent based on the weight of the dry product. Thus, when using soy protein concentrate which usually possesses a somewhat high natural oil content, little or no additional oil need be added. On the other hand, the oil content of pea protein concentrate is much lower and in order to obtain a satisfactory product which can be sheeted and formed into laminates, it is generally necessary to supplement the oil content by the addition of edible oil. In the case of pea protein-containing materials, an addition of oil in an amount of up to about 40 percent giving rise to a total oil content of about 10 to about 40 percent, was found satisfactory, with an addition of about 20 percent oil being preferred. However, the product may, for example, contain as little as 1 percent edible oil. Practically any edible oil may be employed, including natural and synthetic oils, for example, rapeseed, soybean, cottonseed, peanut, palm and corn oils and in either non-hydrogenated or partially hydrogenated form.

In some cases, the texture of the product of the invention can be further advantageously modified by the use of binders so as to make the product firmer or softer. Suitable binders included pea protein concentrate, soy protein, wheat—flour, carageenan, and sodium carboxymethylcellulose. In addition, it was found possible to improve the nutritive qualities of a product based on pea protein by the use of a blend of pea protein concentrate and vital wheat gluten or other suitable nutrient.

A wide variety of dehydration and rehydration conditions can be employed in the process of the invention. However, generally speaking in order to complete dehydration reasonably rapidly elevated temperatures are preferred, but the temperature employed during dehydration should preferably not exceed about 80°C in order to avoid case hardening with subsequent cracking and pocket formation in the dehydrated product, although temperatures as high as about 130° have been used. Dehydration can be conveniently effected in either a vacuum oven or an air oven.

Any other desired additives, such as colouring agents, seasoning agents and supplementary nutrients, can also be incorporated into the products of the invention either at an intermediate stage or a final stage of their production.

The starch fraction which is obtained as a byproduct in the production of plant protein concentrates can be separately utilized for a variety of conventional purposes, such as brewers adjunct and as a de-sliming agent in potash refining.

Plant protein concentrates used in the process of the invention generally contain about 60 to 70 percent protein, as compared to the lower protein flours and higher protein isolates. Water solubility or dispersability of the protein concentrate may be increased, if required, by increasing the alkalinity of the aqueous medium.

The following Examples illustrate the invention.

EXAMPLE 1

A pea protein concentrate was first prepared from field peas of the Century variety. There are various methods of such preparation available. According to one procedure, the peas were split in a grinding mill and the hulls removed in a fanning mill. The dehulled peas were ground finer in the grinding mill to 100-mesh to form a flour havng a protein content of about 25 percent. Ten pounds of the pea flour was added with stirring to five gallons (50 pounds) of water and 0.1 pounds of calcium oxide, to give a slurry having a pH of 9. The slurry was passed through a Bauer pulp refiner three times for further grinding and mixing. Starch was removed from the slurry in a 30 cm. diameter Sharples centrifuge operated at 15,000 rpm. The resulting pea protein concentrate solution contained about 5 percent protein and 2.5 percent other solubles which were mainly carbohydrates. Approximately 3.5% of rapeseed oil was added thereto with mixing and the dispersion was then transferred by a peristaltic pump to a Buflovak double drum dryer, with bottom splash feed. The drums were 30 cm. in diameter by 46 cm. in width and were heated by 30 psig steam. The resultant sheeted product was removed from the drum, and folded immediately. The dehydrated sheet had a moisture content of 3.3 percent and contained (on a moisture-free basis) fat 31.2 percent, protein 41.4 percent and carbohydrate and ash 27.4 percent.

In another procedure, the peas with or without the hulls, were ground in an Alpine pin mill to form a pea flour with a fineness extending down to less than 325 mesh, and having a protein content of about 25 percent. The pea flour was passed through an Alpine air classifier to produce a pea protein concentrate containing about 60 percent protein which, prior to the formation of the sheeted product therefrom, was slurried in an aqueous medium, followed by drum drying.

After removal from the drum and folding as described, the folded sheets were rehydrated and formed into a ¾ inch thick laminate. The laminate was dehydrated by heating at 105°C for three hours and then rehydrated while simultaneously adding Maggi 3H3 poultry flavour (manufactured by the Nestle Company, Inc. of New York). The resulting product was suitable for eating without further processing or could alternatively be fried or broiled.

EXAMPLE 2

Laminates were made from pea protein concentrate sheets containing 27.6 percent fat and 40.8 percent protein and produced by a method similar to the latter procedure described in Example 1. Extensive drying trials were carried out on cubes of the laminate in order to investigate the optimum dehydration conditions for pea protein-containing products. Drying was carried out on different sample cubes in an air oven at 70°C and 80°C for varying periods of up to 8 hrs. The results are shown in the following Table 1.

Table 1

Effect of dehydrating conditions on laminate moisture content.

| Dehydration Time (Hrs) | Moisture Content 70°C | 80°C |
|---|---|---|
| 0 | 68.2 | 63.4 |
| 1 | 43.8 | 37.1 |
| 2 | 28.9 | 22.3 |
| 3 | 19.2 | 12.3 |
| 4 | 13.3 | 5.3 |
| 6 | 4.7 | 2.9 |
| 8 | 2.4 | 1.4 |

From the above results, it was considered that optimum drying conditions were achieved by operating at about 80°C for about six hours. The higher temperature provided somewhat faster drying and the rehydrated product was firmer and had better bite resistance than cubes dried at 70°C.

It was ascertained from further investigations that a particularly good quality product could be achieved if initial drying was carried out at about 80°C for about 2 to 3 hours, followed by storage in a refrigerator for a number of hours, e.g. 16 hours, and thereafter completing the balance of the total of bout six hours drying by further heating at 80°C. This procedure had the effect of permitting sufficient time for moisture in the middle of the cubes to migrate towards the surface during the refrigeration period for removal during the final drying and resulted in a stronger cube.

Notwithstanding the foregoing results, it has been found that when the drying air humidity is very low, it is desirable to use mild dehydrating conditions to avoid stress cracking. For example, hydrated cubes produced in the normal manner have been dehydrated in an air oven in six 2-hour periods at 40°C with an interval of about 24 hours between each drying period. However, it is clearly desirable that the higher optimum temperatures should be used if possible and, therefore, it is strongly recommended that the humidity of the drying oven be appropriately raised and controlled to permit such temperatures to be used.

EXAMPLE 3

A further sample of pea protein concentrate was prepared and converted into laminate form by a method similar to the latter procedure described in Example 1 and 2, but with drying being carried out at about 80°C for about 6 hours. The laminate contained 28.5 percent fat and 34.5 percent protein. Tests were carried out on the laminates to determine operable and optimum rehydration conditions by measurement of the increase in moisture content of cubes of the laminate produced using various drying temperatures and with various rehydration periods. Each test comprised rehydrating a group of six cubes and the results obtained are shown in the following Table II.

Table II

Effect of rehydration conditions on laminate moisture content.

| Rehydration Time (Hrs) | Simmer at 98°C | Heat at 75°C | Warm at 55°C | Soak at Room Temperature (21°C) |
|---|---|---|---|---|
| 0.25 | 50.5 | 50.3 | 50.9 | 38.2 |
| 0.50 | 56.9 | 55.0 | 50.3 | 39.9 |
| 1.00 | 60.0 | 56.7 | 55.6 | 38.3 |
| 1.50 | 63.8 | 52.9 | 57.2 | — |
| 2.00 | 60.9 | 53.9 | 51.7 | 46.1 |
| 4.00 | 62.2 | 55.0 | 55.3 | 46.9 |
| 6.00 | — | — | — | 52.9 |
| 24.00 | — | — | — | 57.3 |
| 32.00 | — | — | — | 59.1 |

It can be seen from the results given in Table II that rehydration occurred most rapidly at the higher temperatures and for the product in question appears to approach a maximum moisture content of 60 ± 5 percent. Some deterioration in quality appeared in the samples rehydrated at 98°C for one hour or more. Binding and resultant texture in most cases was good.

Some correlation was found to exist between moisture content and bite resistance (as measured with a recording shear press). A high moisture content tends to reduce both the bite resistance and shear force. The preferred rehydration condition was considered to comprise simmering at about 98°C for about 30 minutes.

EXAMPLE 4

A further sample of pea protein concentrate was prepared and converted into laminate form by a method similar to that described in Example 3. The laminated sheets contained 6.9 percent moisture, 17.0 percent fat and 43.5 percent protein.

A number of tests were carried out on cubes of the laminated sheets in order to illustrate the effect of repeated dehydration and rehydration on the texture of the product. The moisture content and bite resistance of the laminated cubes were determined by means of a recording single blade shear cell. The results obtained are shown in the following Table III.

Table III

Effect of repeated dehydration and rehydration.

| HYDRATION | MOISTURE (%) | SHEAR FORCE (lbs) |
|---|---|---|
| First (laminate as made) | 72.5 | 1.5 |
| Second | 65.8 | 1.8 |
| Third | 61.8 | 3.1 |
| Fourth | 61.9 | 3.8 |

Thus, the laminate as made with a single hydration step had a moisture content of 72.5 percent and this decreased to 65.8 percent during the second hydration, and 61.8 percent during the third. The moisture content appeared to level off at about 62 percent during the third and fourth hydrations. The consistent increase in shear force with each successive dehydration-hydration probably resulted from the decrease in moisture content accompanied by increased denaturation of the protein. Thus, second and subsequent dehydration-hydration cycles resulted in marked increase of bite resistance as indicated by shear force, thereby giving rise to a product more closely resembling natural meat and fish in terms of bite resistance.

A number of additional products based on pea protein which can be used as synthetic food products and which were prepared by methods similar to those of Example 1 are as follows:

Table IV

| Product | Moisture Content | Pea Protein Content | Oil or Fat* added Content |
|---|---|---|---|
| A | 7 | 51.2 | 7.7 |
| B | 5.3 | 35.5 | 38.4 |
| C | 5.1 | 40.8 | 27.6 |
| D | 7.4 | 56.3 | — |
| E | 7 | 34.5 | 28.5 |
| F | 6.9 | 45.3 | 17.1 |

*Rapeseed oil was used for all products except D to which no oil was added and F for which partially hydrogenated rapeseed oil with a Wiley melting point of 35°C was used.

All the above products were capable of being formed into laminates which could be dehydrated and rehydrated. When no oil was added, the dried sheets and laminates tended to be especially brittle. As the added oil content approached 40 percent, the laminated cubes tended to be slightly greasy and it was more difficult to produce a satisfactory laminate. No difference could be detected when partially hydrogenated oil was used in place of the natural oil. The optimum added oil content in the case of the above products appeared to be about 20 percent of either natural or partially hydrogenated rapeseed oil.

In addition, the oil or fat content of the sheets used to make the laminate had a marked effect on the amount of water absorbed by the laminate during the second hydration. Thus, the product containing no added fat had a protein content in the dried sheet of 56.3 and the sheet was found to be capable of absorbing moisture to a content of 71.7 percent during the second hydration. With an added oil content of 17.1 percent, the protein content of the dried sheet constituted 45.3 percent and the moisture content after the second hydration represented 63.2 percent. With 38.4 percent added oil, the figures dropped to 35.5 percent and 51.2 percent, respectively. It will be appreciated that the moisture content in laminates made from sheets containing relatively little added oil more closely resembled that of natural meat.

EXAMPLE 5

As discussed above, a binder may optionally be incorporated in the products of the invention. A number of binders were investigated to determine their effect on the texture of the sheets prepared as described in Example 3. The binders were mixed with water and the resulting mixture was used to hydrate the pea protein-containing sheets prior to lamination. The following aqueous mixtures were used as binders:

1% Pea Protein Concentrate
5% Pea Protein Concentrate
1% Soy Protein Isolate (Supro610)
5% Soy Protein Isolate (Supro610)
1% Sodium Carboxymethylcellulose
1% Carageenan (Calcium C)
5% Wheat Flour After lamination, the product in each case was dehydrated, then rehydrated a second time and evaluated. The results obtained are shown in the following Table V.

Table V

Effect of binders on laminate texture.

| Binder | Laminate Moisture Content % | Comments |
|---|---|---|
| No binder | 49.1 | Good binding, good texture |
| 1% P.P.C. | 47.4 | Some toughening of product |
| 5% P.P.C. | 48.2 | Increased toughening of product |
| 1% Soy Protein Isolate | 55.5 | No apparent effect |
| 5% Soy Protein Isolate | 60.6 | Softened product |
| 1% Sodium Carboxymethylcellulose | 45.9 | Some loss of central individual layer identity |
| 1% Carageenan | 48.4 | Softened product with some loss of layer identity |
| 5% Wheat Flour | 51.8 | Toughened texture |

Generally speaking it was found that binders were not essential for achieving adequate binding of the layers forming the laminate, but that they did reduce the frequency of air pocket formation within the product. Moreover, the moisture content and texture could be modified quite widely depending on the binder selected thereby resulting in considerable flexibility and advantage. Thus, solutions of pea protein concentrate and wheat flour tended to toughen the product, while soy protein concentrate and carageenan seemed to soften the laminate texture even though the shear force obtained in these cases was slightly greater than the control. Both carboxymethylcellulose and carageenan caused some amalgamation of the layers with some loss of their individual identity. However, this is not necessarily a disadvantage provided satisfactory texture and bite resistance are retained, since natural meat products are of course, not usually markedly laminated.

EXAMPLE 6

20 lbs. of soy beans were ground and then wet milled with 100 lbs. of water in a manner similar to that described in Example 1 for peas. The slurry was then passed through a Sharples centrifuge to remove the outer coating from the soy milk. The resulting slurry was used to form soy protein sheets on a drum drier. Calcium oxide equivalent to 1 percent by weight of the solids was added to one portion of the slurry before drum drying and another portion was drum dried without calcium oxide addition. The soy protein sheets resulting from the drum drying contained 8.5 percent moisture, 13.4 percent fat and 45.6 percent protein.

The soy protein sheets were laminated, dehydrated and rehydrated along the lines described in Example 3 for pea protein sheets. The sheets containing calcium oxide were found to be tougher than those not containing calcium oxide, but the cohesion of the laminated product was somewhat inferior in the former case.

EXAMPLE 7

Two pounds of rapeseed flour containing 5.4 percent moisture, 13.4 percent fat, 41.9 percent protein, and 5.2 percent ash was mixed with 20 lbs. of water and 0.18 lb. added rapeseed oil to form a slurry. 1 percent of calcium oxide, based on the solids content was added to the slurry which was then used to form sheets in a drum dryer. The higher pH value resulting from the addition of calcium oxide changed the slurry and sheet color from a brown to a bright yellowish green, probably because of the presence of chlorogenic compounds. The resulting sheet produced a fairly tough, thin film on rehydration which was capable of being formed into a laminate. The dehydrated laminate exhibited quite good binding but was a little fragile. On rehydration, the laminate produced a potential meat analog product having fairly satisfactory appearance and physical properties. However, the natural flavour of this product was somewhat unsatisfactory.

The texture of the laminated pea protein concentrate products prepared in Examples 1 to 4 was compared with raw and cooked beef, chicken and salmon using recording texture testing equipment and a single blade shear cell. The raw and cooked natural beef samples were generally found to exhibit greater shear force than the remaining analog and natural samples and, in general, the shear force was larger for raw than cooked samples (both natural and analog). It was found that the texture of the laminates of Examples 1 to 4 was most similar to the raw and cooked salmon samples from the point of view of compression and shear force.

A number of flavour and cooking trials were carried out in respect of the products of Examples 1 to 4 to which chicken and beef flavour additions had been made. The flavour was made up as a 1 percent aqueous solution which was then used to rehydrate the dehydrated laminate. Cooking trials were carried out on the laminate in cubed form and also on small steak size laminates. Frying was found to be preferable to roasting because of better flavour and moisture retention. Texture and flavour were judged to be generally aceptable. Generally speaking, beef flavoured fried products were considered most acceptable. One trial was carried out in which beef flavoured cubed laminates were lightly fried and then added to a commercial stew from which the natural meat had been removed. After heating the reconstituted stew, it was sampled and the laminated cubes were considered to be a suitable substitute for the natural meat.

A further aspect of the invention is the utilization of the plant protein concentrate as a meat extender. For this purpose, dehydrated sheets of the concentrate may be prepared in accordance with the foregoing and the sheets fragmented to give fragments of, for example, from 100 mesh to about one inch average diameter. The fragments are then rehydrated and may be used either alone or as a meat extender. For the latter purpose, the fragments are mixed with the meat and the mix is processed by grinding or chopping. The resulting product is suitable for processed meat products such as ground meat, hamburger, meat loaf, meat balls, sausages and wieners. In addition to providing a low cost meat extender, the plant protein concentrate reduces shrinkage by holding juices and fat therein.

It has been found that wieners extended in this manner by the addition thereto of about 5 to 10 percent air classified pea protein are quite acceptable as are meat balls, hamburgers, etc. prepared from ground meat to which up to 25 percent of the hydrated fragments have been added as extender.

While we have shown and described herein particular embodiments of our invention it will, of course, be understood that we do not wish to be limited thereto, since many modifications may be made and we contemplate by the appended claims to cover all such modifications as fall within the true spirit and scope of the invention.

We claim:
1. A process for preparing a fragmented food product for admixing with meat products, comprising (a) forming an aqueous solution or dispersion containing pea protein concentrate with up to 40 percent edible oil by weight of the total solids plus oil, (b) drying the solution or dispersion rapidly in sheet form on a heated drying surface to form a sheeted dried product having a moisture content sufficient to permit fragmenting, (c) fragmenting said sheeted product prior to rehydration thereof and (d) thereafter rehydrating the fragmented product to a moisture content of at least about 50 percent to form said fragments suitable for admixing with meat products.

2. A process according to claim 1, wherein the aqueous solution or dispersion contains at least 10 percent edible oil by weight of the total solids plus oil.

3. A process according to claim 1, wherein the rehydration and optionally dehydration is repeated at least once to improve the texture of the product.

4. A process according to claim 1, wherein the rehydrated product is thereafter dried to a moisture content not exceeding about 5 percent by weight of storage.

5. A process according to claim 1, wherein a binder is incorporated into the solution or dispersion in order to modify the texture of the product.

6. A process according to claim 1, wherein natural or synthetic flavoring material is incorporated in the product.

7. A process according to claim 1, wherein a natural or synthetic meat, poultry or fish flavoring material is incorporated in the product during rehydration.

8. A process according to claim 1, wherein the solution or dispersion is converted to a sheeted dried product of up to about 25 percent by weight moisture content.

9. A process according to claim 4, wherein final drying is carried out at a temperature not exceeding about 130°C for from 1 to 12 hours.

10. A process according to claim 9, wherein final drying is carried out at a temperature of about 80°C for about six hours.

11. A process according to claim 9, wherein the drying is carried out by heating at a temperature of about 80°C for about 1 to 3 hours, interrupting the heating to permit interior moisture to migrate to the surface, and thereafter completing the heating to give a final dry product of desired moisture content.

12. A food product in fragmented form in admixture with meat products comprising pea protein concentrate with up to 40 percent edible oil by weight of the solids and oil and produced by the process of claim 1.

13. A product according to claim 12, comprising at least 10 percent edible oil by weight of the solids and oil.

14. A product according to claim 12, flavoured with natural or synthetic meat, poultry or fish flavouring material.

15. A product according to claim 12, comprising pea protein concentrate and from 10 to 30 percent added edible oil.

16. A product according to claim 12, in rehydrated form having a moisture content of at least about 50 percent.

17. A product according to claim 12, wherein the edible oil is rapeseed, soybean, cottonseed, peanut, palm or corn oil or a partially hydrogenated product thereof.

* * * * *